United States Patent [19]

Wittren

[11] Patent Number: 4,556,078
[45] Date of Patent: Dec. 3, 1985

[54] PRIORITY VALVE

[75] Inventor: Richard A. Wittren, Cedar Falls, Iowa

[73] Assignee: Deere & Company, Moline, Ill.

[21] Appl. No.: 621,359

[22] Filed: Jun. 15, 1984

[51] Int. Cl.[4] ............................................. G05D 11/00
[52] U.S. Cl. ..................................... 137/118; 137/101; 91/516
[58] Field of Search ................... 137/101, 118; 60/422; 91/514, 516, 532

[56] References Cited

U.S. PATENT DOCUMENTS

| 2,737,196 | 3/1956 | Eames | 137/101 |
| 2,846,850 | 8/1958 | Hall | 137/118 |
| 3,241,318 | 3/1966 | Rohde | 137/101 |
| 3,703,186 | 11/1972 | Brewer | 137/118 |
| 3,841,095 | 10/1974 | Baker | 91/516 |
| 3,937,243 | 2/1976 | Harkrader et al. | 137/118 |
| 3,979,908 | 9/1976 | Alderson | 60/422 |
| 4,192,337 | 3/1980 | Alderson et al. | 137/118 |
| 4,308,787 | 1/1982 | Parquet et al. | 91/516 |

OTHER PUBLICATIONS

U.S. patent application Ser. No. 524,806, 8/11/83, now U.S. Pat. No. 4,470,260.
U.S. patent application Ser. No. 524,802, 8/11/83, now U.S. Pat. No. 4,470,259.
U.S. patent application Ser. No. 522,920, 8/12/83, now U.S. Pat. No. 4,463,557.
U.S. patent application Ser. No. 522,933, 8/12/83, now U.S. Pat. No. 4,463,558.

Primary Examiner—Samuel Scott
Assistant Examiner—Noah Kamen

[57] ABSTRACT

A priority valve is disclosed for controlling fluid flow between a power source and a secondary hydraulic function operated by the power source. The priority valve includes a housing having first and second bores formed therein. An inlet passage connects the power source to the first bore while an outlet passage connects the first bore to the hydraulic function. A priority function is also fluidly connected to the power source upstream of the priority valve. A valve spool is positioned in the first bore. The valve spool is movable between a first position blocking fluid flow from the first passage to the outlet passage and a second position permitting fluid flow therebetween. A pin is movably positioned in the second bore and has an enlarged end which extends into the first bore. Springs are present for urging the valve spool toward the first position and the pin toward the spool valve. A load signal passage connecting the priority function to the second end of the first bore. When full fluid is demanded by the priority function the valve spool moves toward its first position. When the priority valve demands less than full flow the spool valve moves toward its second position. If the priority function demands pressure approaching a maximum pressure which can be delivered by the power source the enlarged end of the pin contacts the valve spool and forces it toward its second position.

11 Claims, 2 Drawing Figures

PRIORITY VALVE

FIELD OF THE INVENTION

This invention relates to a priority valve for controlling fluid flow between a power source and a hydraulic function operated by the power source.

BACKGROUND OF THE INVENTION

In many agricultural and industrial off-road equipment, a priority valve is used in a power on demand system to assure that a priority function, such as steering, always has available fluid. In such systems, sould the wheel encounter a curb or rut wherein the priority function demands a greater pressure than the pump can supply, it is usual that the priority function will stall. When this happens, the pressure differential across the priority valve becomes zero causing the priority valve to shut off flow to secondary or non-priority functions. The current practice for remedying this problem is to provide a pilot line relief valve and an orifice pilot flow for the spring chamber. The relief valve is set above the maximum pressure requirement for the priority function but below maximum pump pressure. However the relief valve and orifice pilot flow suffer disadvantages in that there is added noise, added power loss at stall, and in case of some steering applications, continued slow steering wheel rotation during stall or when in a lock position.

Now a priority valve has been invented which eliminates the need for the orifice pilot and relief valve.

SUMMARY OF THE INVENTION

Briefly, this invention relates to a priority valve for controlling fluid flow between a power source and a hydraulic function operated by the power source. The priority valve includes a housing having first and second bores formed therein with an inlet passage connecting the power source to the first bore and an outlet passage connecting the first bore to the hydraulic function. A priority function is also fluidly connected to the power source upstream of the valve. Positioned within the first bore is a valve spool movable between the first and second ends of the first bore. The valve spool has an annular groove which is in constant communication with both the inlet passage and with the first end of the first bore. The valve spool is movable between a first position blocking fluid flow from the inlet passage to the outlet passage and a second position permitting fluid flow therethrough. A movable pin is positioned in the second bore and has an enlarged end which extends into the first bore. First and second springs are present which urge the spool valve toward the first position and the pin toward the spool valve. The priority valve further includes a load signal passage connecting the priority function to the second end of the first bore. With an increase in pressure in the load signal passage, the spool valve is urged toward the first position while a decrease in pressure in the load signal passage allows the spool valve to move towards the second position under the influence of pressure in the first end of the first bore. The enlarged end of the pin is also capable of contacting and forcing the spool valve toward the second position when the priority function demands pressure approaching a maximum pressure value which can be delivered by the power source.

The general object of this invention is to provide a priority valve for a hydraulic system. A more specific object of this invention is to provide a priority valve for controlling fluid flow from a power source to a hydraulic function.

Another object of this invention is to provide a simple and reliable priority valve.

Still another object of this invention is to provide a priority valve for a hydraulic system which reduces noise within the system and eliminates service problems associated with relief valve durability, adjustment and orifice plugging.

A further object of this invention is to provide a priority valve which remains in a position which allows fluid flow to non-priority functions even though the pressure differential across the priority valve may be zero due to stalling of the priority function.

Other object and advantages of the present invention will become more apparent to those skilled in the art in view of the following description and the accompanying drawings.

DETAILED DESCRIPTION OF THE PREFERRED EMBODIMENTS

Figure 1:
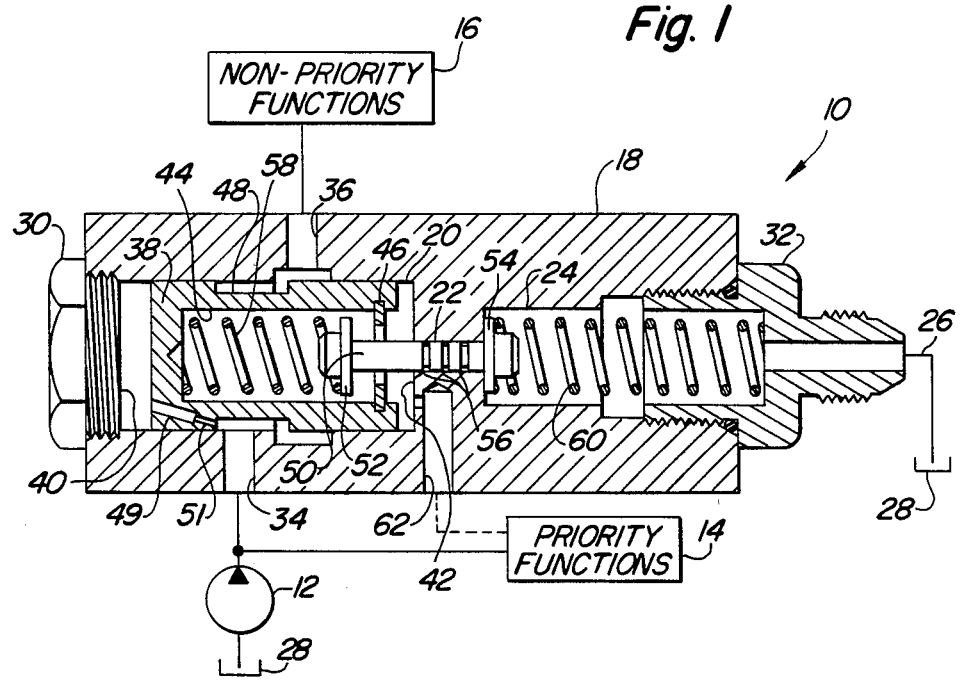
FIG. 1 is a sectional view of a priority valve with the remainder of the hydraulic circuit shown schematically.

Referring to FIG. 1, a priority valve 10 is shown in a hydraulic circuit wherein a power source 12, such as a fixed or variable displacement pump, supplies pressurized fluid directly to one or more priority functions 14, only one of which is shown. In most agricultural and industrial off-road type equipment, the steering apparatus is normally one of the priority functions and it will be referred to hereinafter as the priority function 14. One or more non-priority or secondary hydraulic functions 16 are also hydraulically operated by the power source 12. These can include hydraulic cylinder which operate hitches, auxiliary motors, etc.

The priority valve 10 is situated downstream of the priority function 14 and upstream of the secondary function 16. The priority valve 10 includes a housing 18 having first and second bores 20 and 22 formed therein. In addition, a spring cavity 24 is coaxially aligned with the second bore 22 and communicates, via a drain passage 26, with a reservoir 28. For purposes of assembly, the housing 18 is shown with a pair of plugs 30 and 32 which close off one end of the first bore 20 and the spring cavity 24, respectively.

The first bore 20 is connected to the power source 12 by an inlet passage 34 and to the secondary function 16 by an outlet passage 36. Positioned within the first bore 20 is a valve spool 38 which is movable between first and second ends 40 and 42, respectively of the first bore 20. The valve spool 38 includes an internal bore 44 formed adjacent to the second end 42, a snap ring 46 retained on the internal bore 44, and an annular groove 48 formed on its outer circumference. The annular groove 48 is in constant communication with the inlet passage 34 and also with the first end 40 of the first bore 20, via a flow passage 49. The flow passage 49 connects the first end 40 to the annular groove 48 so that the pressurized fluid discharge from the power source 12 can be routed to the first end 40 and act on the adjacent surface of the valve spool 38. The passage 49 can have a restriction 51 formed across it so as to meter fluid flow into or out of the first end 40. The valve spool 38 is movable between a first position blocking fluid flow from the inlet passage 34 to the outlet passage 36 and a second position permitting fluid flow therebetween.

A pin 50 is movably positioned in the second bore 22 and has first and second enlarged ends 52 and 54 which extend into the first bore 20 and into the spring cavity 24, respectively. The enlarged ends 52 and 54 limit the movement of the pin 50 within the second bore 22. Enlarged end 54 need not be an integral part of pin 50. Preferably, the outside diameter of the pin 50, disregarding the first and second enlarged ends 52 and 54, is approximately equal to the inner diameter of the second bore 22 so as to prevent fluid flow therethrough. However, it is anticipated that some leakage will occur along the length of the pin 50 into the spring cavity 24 and that this fluid will eventually find its way through the passage 26 to the reservoir 28. In this regard, the pin 50 can contain one or more annular grooves 56 which enables the pressure of any fluid trapped therein to be distributed evenly about its circumference thereby minimizing leakage of fluid along its length and reducing frictional forces on the pin 50.

The priority valve 10 also includes a first spring 58 positioned in the first bore 20 between the valve spool 38 and the enlarged first end 52 of the pin 50. A second spring 60, having a higher preload than the first spring 58, is positioned in the spring cavity 24 and abuts the second enlarged end 54 of the pin 50. With the second spring 60 having the higher preload, one can be assured that the pin 50 will be urged leftwards within the first bore 20 when there is no pressurized fluid in the first end 40 of the bore 20. It should also be noted that the first enlarged end 52 of the pin 50 is sized so as to abut against the snap ring 46 and force the valve spool 38 rightwards. This happens when the pressure within the second end 42, in combination with the force of the first spring 58, sufficiently exceeds the force of the second spring 60.

Lastly, the priority valve 10 includes a load signal passage 62 which connects the priority function 14 to the second end 42 of the first bore 20. The pressure in the load signal passage 62 is typically lower than or equal to the pressure in the inlet passage 34. This is because the structure of the priority function 14 creates an orifice which can cause a pressure drop between the pump 12 and the load signal passage 62. An example of a priority function having a load signal line for connection to passage 62 is given in U.S. Pat. No. 4,463,558 which shows a hydraulic steering system with the load signal line indicated by number 46. When there is no flow demand to the priority function 14, the pressure in load signal passage 62 drops to zero. When full fluid flow is demanded by the priority function 14, the pressure difference across the priority function 14 will remain relatively low, due to little restriction across the priority function 14, and the valve spool 38 will remain in its first position. In this position, the opening between the inlet passage 34 and the outlet passage 36 can be blocked thereby assuring that the priority function 14 has full fluid flow. When the priority function 14 demands less than full fluid flow from the power source 12, the pressure difference across the priority function 14 increases thereby permitting the valve spool 38 to move rightwards. Such movement allows fluid flow from the inlet passage 34 to the non-priority functions 16.

Should a situation occur where the steering wheels of the vehicle would encounter a rock or contact a curb or other stationary object, the priority function 14 could demand a pressure approaching or exceeding the maximum pressure value which could be delivered by the power source 12. In this situation, the pressure in the load signal passage 62 would increase above a predetermined value and the force of this pressure on the first end 52 of the pin 50, together with the force of the first spring 58, would overcome the force of the second spring 60 and force the pin 50 rightwards. The pin 50 would then abut against the snap ring 46 and force the valve spool 38 to the right. This action assures that there will be an open passage between the power source 12 and the non-priority functions 16 should the priority function 14 stall. If a situation occurs where the priority function 14 is not stalled but the load signal pressure in the passage 62 is quite high, then a condition could exist where the pin 50 is moved rightward but not to the extent that the enlarged end 52 contacts the snapring 46.

One skilled in the art will quickly realize that the spring rates of the first and second springs 58 and 60 can be varied, as well as the length of the pin 50, the length of the first bore 20 and the length of the valve spool 38. By sizing these components, one will be able to specify at what pressure the first enlarged end 52 of the pin 50 will contact the snap ring 46 and force the valve spool 38 rightwards. The components can be sized such that the pin 50 will cause the valve spool 38 to move rightwards at a pressure value above the maximum pressure requirement of the priority function 14 but below the maximum pump pressure of the power source 12. In this fashion the pin 50 will replace the functions of the conventional relief valve and pilot orifice.

Figure 2:
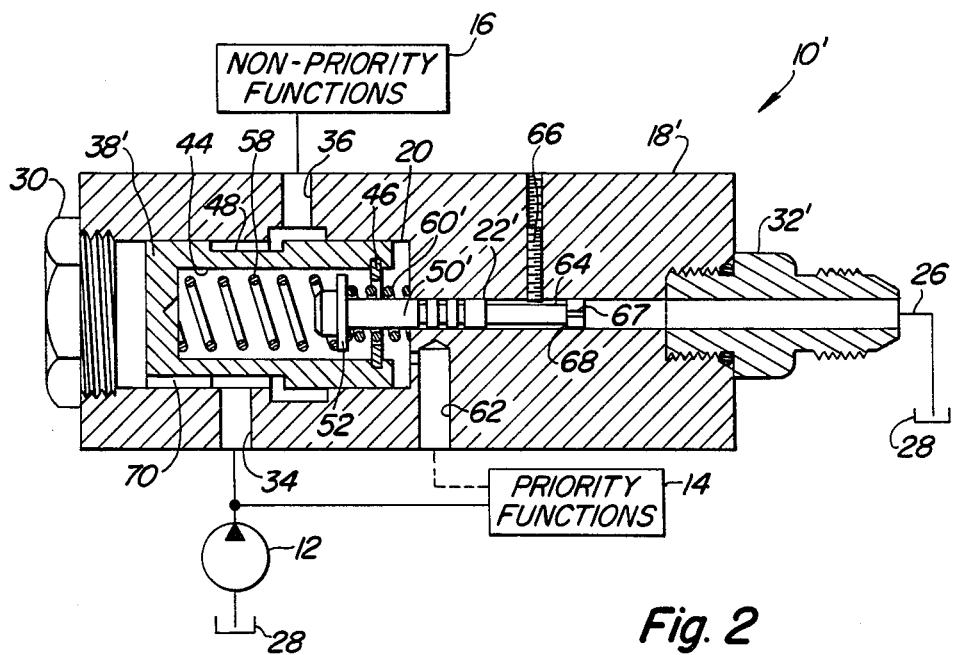
FIG. 2 is a sectional view of an alternative embodiment of the priority valve with the hydraulic circuit shown schematically.

Referring to FIG. 2, an identical hydraulic circuit is shown having a priority valve 10′ which depicts an alternative embodiment. For matter of convenience, similar elements in FIG. 2 are denoted by the same numerals as those used in FIG. 1. The priority valve 10′ includes a housing 18′ which differs from housing 18 in that it does not contain a spring cavity 24. Instead, a second spring 60′ is positioned between a first end 52′ of a pin 50′ and the right surface of the first bore 20. The pin 50′ is elongated and contains an annular groove 64 formed about its outer circumference approximate its right end. A set screw 66 is retained in the housing 18′ which aligns with the annular groove 64. The annular groove 64 is sized such that upon leftward movement of the pin 50′, a right surface 68 of the annular groove 64 will abut and contact the set screw 66 and prevent further leftward movement of the pin 50′. In short, the annular groove 64 and the set screw 66 serve as a stop and perform the same function as the second enlarged end 54 of the pin 50, as is shown in FIG. 1. The pin 50′ could also have a groove 67 formed in its right end to permit fluid trapped in the annular groove 64 to be drained to the reservoir 28. Furthermore, a smaller size plug 32′ is used to seal off the second bore 22′. Also, the flow passage 49 has been replaced by a passage 70 which is formed on the outer circumference of a valve spool 38′. Aside from these few difference, the operation of the priority valve 10′ is identical to that of the priority valve 10.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A priority valve for controlling fluid flow between a power source and a hydraulic function operated by said power source, said valve comprising:
   (a) a housing having first and second bores formed therein;
   (b) an inlet passage connecting said power source to said first bore and an outlet passage connecting said first bore to said hydraulic function;
   (c) a priority function which receives fluid from said power source positioned upstream of said inlet passage;
   (d) a valve spool positioned in said first bore so as to divide said first bore into first and second ends, said valve spool having an annular groove which is in constant communication with both said inlet passage and with said first end of said first bore, said valve spool being movable between a first position which seals said outlet passage from communication with said annular groove and a second position wherein said annular groove is in communication with said outlet passage;
   (e) a pin movably positioned in said second bore and having an enlarged end which extends into said first bore;
   (f) biasing means for urging said valve spool toward said first position and said pin toward said valve spool;
   (g) means for engaging said pin with said spool valve after limited free movement of said pin out of said first bore; and
   (h) a load signal passage establishing fluid communication between said priority function and said second end of said first bore which fluid acts to urge said valve spool toward said first position and said pin out of said bore such that a decrease in pressue difference between said load signal passage and said inlet passage urges said valve spool toward said first position, an increase in pressure difference between said load signal passage and said inlet passage allows said valve spool to move toward said second position, and a predetermined maximum fluid pressure within said load signal passage causes said pin to move out of said first bore engaging and moving said spool toward said second position.

2. The priority valve of claim 1 wherein said biasing means includes first and second springs, said first spring being positioned between said valve spool and said pin.

3. The priority valve of claim 2 wherein said second spring has a higher preload than said first spring.

4. The priority valve of claim 2 wherein an internal bore is formed in said valve spool adjacent to said second end of said first bore and both said first spring and said enlarged end of said pin are positioned within said internal bore.

5. The priority valve of claim 4 wherein said engagement means comprises a snap ring retained on the inner periphery of said internal bore and situated between said enlarged end of said pin and said second bore having an inner diameter less than the outer diameter of said enlarged pin end such that said enlarged pin end contacts said snap ring forcing said valve spool toward said second position when the pressure in said load signal passage exceeds a predetermined value, and the force caused by this pressure acting on said pin together with the force of said first spring exceeds the force of said second spring.

6. The priority valve of claim 1 wherein said pin has at least one annular groove formed about its circumference which enables the pressure of any trapped fluid therein to be distributed about its circumference thereby minimizing leakage of fluid along the length thereof and reducing frictional forces on said pin.

7. The priority valve of claim 6 wherein said pin has a plurality of spaced apart annular grooves formed about its circumference.

8. The priority valve of claim 1 wherein a stop is present to limit movement of said pin into said first bore.

9. A priority valve for controlling fluid flow between a power source and a hydraulic function operated by said power source, said valve comprising:
   (a) a housing having first and second bores formed therein;
   (b) an inlet passage connecting said pump to said first bore and an outlet passage connecting said first bore to said hydraulic function;
   (c) a priority function which receives fluid from said power source positioned upstream of said inlet passage;
   (d) a valve spool positioned in said first bore so as to divide said first bore into first and second ends, said valve spool having an annular groove which is in constant communication with said inlet passage and a passageway constantly connecting said first end of said first bore to said inlet passage, said valve spool being movable between a first position which seals said outlet passage from communication with said annular groove and a second position wherein said annular groove is in communication with said outlet passage;
   (e) a pin movably positioned in said second bore and having an enlarged end which extends into said first bore;
   (f) first and second springs positioned in said first bore for urging said valve spool toward said first position and said pin toward said valve spool;
   (g) means for engaging said pin with said spool valve after limited free movement of said pin out of said first bore; and
   (h) a load signal passage establishing fluid communication between said priority function and said second end of said first bore which fluid acts to urge said valve spool toward said first position and said pin out of said bore such that a decrease in pressure difference between said load signal passage and said inlet passage urges said valve spool toward said first position, an increase in pressure difference between said load signal passage and said inlet passage allows said valve spool to move toward said second position, and a predetermined maximum fluid pressure within said load signal passage causes said pin to move out of said first bore engaging and moving said spool toward said second position.

10. The priority valve of claim 9 wherein said passageway has a restriction formed thereacross for limiting fluid flow therethrough.

11. A priority valve of the type used between a fluid power source and hydraulic functions operated by said power source, one of said functions being a priority function positioned upstream of said priority valve and at least one other function being a secondary function positioned downstream of said priority valve, said priority valve comprising:
- (a) a housing having first and second bores formed therein and a spring cavity communicating with said second bore which is connected to a fluid reservoir;
- (b) an inlet passage connecting said power source to said first bore and an outlet passage connecting said first bore to said secondary function;
- (c) a valve spool positioned in said first bore so as to divide said first bore into first and second ends, said valve spool having an internal bore formed therein adjacent to said second end of said first bore, a stop connected to the inner periphery of said internal bore, and an annular groove which is in constant communication with both said inlet passage and with said first end of said first bore, said valve spool being movable between a first position which seals said outlet passage from communication with said annular groove and a second position wherein said annular groove is in communication with said outlet passage.
- (d) a pin movably positioned in said second bore having first and second enlarged ends, said first enlarged end extending into said internal bore formed in said valve spool beyond said stop and said second enlarged end extending into said spring cavity, said enlarged ends limiting the movement of said pin with said first enlarged end being sized to engage said stop after movement of said pin for a predetermined distance out of said internal bore;
- (e) a first spring positioned in said first bore between said valve spool and said first enlarged end of said pin for urging said valve spool toward said first position;
- (f) a second spring positioned in said spring cavity which contacts said second enlarged end of said pin for urging said pin into said first bore; and
- (g) a load signal passage establishing fluid communication beteen said priority function and said second end of said first bore which fluid acts to urge said valve spool toward said first position and said pin out of said bore such that a decrease in pressure difference between said load signal passage and inlet passage urges said valve spool to move toward said first position, an increase in pressure difference between said load signal passage and said inlet passage allows said valve spool to move toward said second position and a predetermined maximum fluid pressure within said load signal passage causes first enlarged end of said pin to contact said stop and force said valve spool toward said second position.

* * * * *